(12) United States Patent
Sullivan et al.

(10) Patent No.: US 7,792,056 B2
(45) Date of Patent: Sep. 7, 2010

(54) LIGHTWEIGHT NODE BASED NETWORK REDUNDANCY SOLUTION LEVERAGING RAPID SPANNING TREE PROTOCOL (RSTP)

(75) Inventors: Michael J. Sullivan, Rancho Santa Margarita, CA (US); David A. Naumann, Signal Hill, CA (US)

(73) Assignee: The Boeing Company, Chicago, IL (US)

( * ) Notice: Subject to any disclaimer, the term of this patent is extended or adjusted under 35 U.S.C. 154(b) by 245 days.

(21) Appl. No.: 11/868,080

(22) Filed: Oct. 5, 2007

(65) Prior Publication Data

US 2008/0279096 A1 Nov. 13, 2008

Related U.S. Application Data

(60) Provisional application No. 60/917,494, filed on May 11, 2007.

(51) Int. Cl.
*H04L 12/28* (2006.01)
(52) U.S. Cl. .................. 370/254; 370/256; 370/257
(58) Field of Classification Search ............. 370/254, 370/394
See application file for complete search history.

(56) References Cited

U.S. PATENT DOCUMENTS

| | | | |
|---|---|---|---|
| 5,150,360 A | 9/1992 | Perlman et al. | |
| 5,959,968 A | 9/1999 | Chin et al. | |
| 6,826,158 B2 | 11/2004 | Seaman et al. | |
| 6,865,160 B1 | 3/2005 | Bare | |
| 7,061,875 B1 | 6/2006 | Portolani et al. | |
| 7,177,946 B1 * | 2/2007 | Kaluve et al. | 709/242 |
| 2001/0021177 A1 | 9/2001 | Ishii | |
| 2002/0023170 A1 * | 2/2002 | Seaman et al. | 709/235 |
| 2006/0047851 A1 | 3/2006 | Voit et al. | |
| 2006/0120279 A1 | 6/2006 | Mitsumori | |

OTHER PUBLICATIONS

Terms for Use for IEEE Standards Publications Delivered in Electronic Form; http://standards.ieee.org/getieee802/download/802.1D-2004.pdf; 2006; 3 pages.
802.1D™ IEEE Standard for Local and Metropolitan Area Networks Media Access Control (MAC) Bridges; IEEE Computer Society; Jun. 9, 2004; 265 pages.
UK Search Report for Application No. GB0808501.1; Aug. 14, 2008; 4 pages.

* cited by examiner

*Primary Examiner*—Robert W Wilson
(74) *Attorney, Agent, or Firm*—Armstrong Teasdale LLP (57) ABSTRACT

A method for dynamic path failover in a network with two or more redundant and interconnected bridges, is described. A first bridge operates as a root bridge and each node includes two ports where each port is coupled to a respective one of the bridges. The method includes defining a bridge identifier at a node which presents the node as a capable bridge to the two or more fully compliant, RSTP enabled MAC bridges, forwarding a BPDU message from the node that defines the node as an inferior alternate path to the root bridge, facilitating the dynamic sensing of the absence of communication between the root bridge and the node, receiving a topology change message at the node from the second redundant bridge, and sending an agreement message from the node to the second redundant bridge such that the node automatically begins receiving messages from the second redundant bridge.

20 Claims, 7 Drawing Sheets

FIG. 1

| Field | Octet |
|---|---|
| Protocol Identifier | 1, 2 |
| Protocol Version Identifier | 3 |
| BDPU Type | 4 |
| Flags | 5 |
| Root Identifier | 6, 7, 8, 9, 10, 11, 12, 13 |
| Root Path Cost | 14, 15, 16, 17 |
| Bridge Identifier | 18, 19, 20, 21, 22, 23, 24, 25 |
| Port Identifier | 26, 27 |
| Message Age | 28, 29 |
| Max Age | 30, 31 |
| Hello Time | 32, 33 |
| Forward Delay | 34, 35 |

```
Frame 47 (60 bytes on wire, 60 bytes captured)
IEEE 802.3 Ethernet
    Destination: Spanning-tree-(for-bridges)_00 (01:80:c2:00:00:00)
    Source: 11:11:11:11:11:02
    Length: 39
    Trailer: 00000000000000
Logical-Link Control
    DSAP: Spanning Tree BPDU (0x42)
    IG Bit: Individual
    SSAP: Spanning Tree BPDU (0x42)
    CR Bit: Command
    Control field: U, func=UI (0x03)
Spanning Tree Protocol
    Protocol Identifier: Spanning Tree Protocol (0x0000)
    Protocol Version Identifier: Rapid Spanning Tree (2)
    BPDU Type: Rapid/Multiple Spanning Tree (0x02)
    BPDU flags: 0x3c (Forwarding, Learning, Port Role: Designated)
        0... .... = Topology Change Acknowledgment: No
        .0.. .... = Agreement: No
        ..1. .... = Forwarding: Yes
        ...1 .... = Learning: Yes
        .... 11.. = Port Role: Designated (3)
        .... ..0. = Proposal: No
        .... ...0 = Topology Change: No
    Root Identifier: 32768 / 11:11:11:11:11:01
    Root Path Cost: 0
    Bridge Identifier: 32768 / 11:11:11:11:11:01
    Port identifier: 0x8001
    Message Age: 0
    Max Age: 6
    Hello Time: 1
    Forward Delay: 4
    Version 1 Length: 0
```

FIG. 4

Frame 48 (60 bytes on wire, 60 bytes captured)
IEEE 802.3 Ethernet
   Destination: Spanning-tree-(for-bridges)_00 (01:80:c2:00:00:00)
   Source: 22:22:22:22:22:02
   Length: 39
   Trailer: AAAAAAAAAAAAAA
Logical-Link Control
   DSAP: Spanning Tree BPDU (0x42)
   IG Bit: Individual
   SSAP: Spanning Tree BPDU (0x42)
   CR Bit: Command
   Control field: U, func=UI (0x03)
Spanning Tree Protocol
   Protocol Identifier: Spanning Tree Protocol (0x0000)
   Protocol Version Identifier: Rapid Spanning Tree (2)
   BPDU Type: Rapid/Multiple Spanning Tree (0x02)
   BPDU flags: 0x7c (Agreement, Forwarding, Learning, Port Role: Designated)
      0... .... = Topology Change Acknowledgment: No
      .1.. .... = Agreement: Yes
      ..1. .... = Forwarding: Yes
      ...1 .... = Learning: Yes
      .... 11.. = Port Role: Designated (3)
      .... ..0. = Proposal: No
      .... ...0 = Topology Change: No
   Root Identifier: 32768 / 11:11:11:11:11:01
   Root Path Cost: 5
   Bridge Identifier: 65535 / 22:22:22:22:22:01
   Port identifier: 0x8001
   Message Age: 1
   Max Age: 6
   Hello Time: 1
   Forward Delay: 4
   Version 1 Length: 0

FIG. 5

Frame 95 (60 bytes on wire, 60 bytes captured)
IEEE 802.3 Ethernet
   Destination: Spanning-tree-(for-bridges)_00 (01:80:c2:00:00:00)
   Source: 33:33:33:33:33:02
   Length: 39
   Trailer: 00000000000000
Logical-Link Control
   DSAP: Spanning Tree BPDU (0x42)
   IG Bit: Individual
   SSAP: Spanning Tree BPDU (0x42)
   CR Bit: Command
   Control field: U, func=UI (0x03)
Spanning Tree Protocol
   Protocol Identifier: Spanning Tree Protocol (0x0000)
   Protocol Version Identifier: Rapid Spanning Tree (2)
   BPDU Type: Rapid/Multiple Spanning Tree (0x02)
   BPDU flags: 0x4e (Agreement, Port Role: Designated, Proposal)
      0... .... = Topology Change Acknowledgment: No
      .1.. .... = Agreement: Yes
      ..0. .... = Forwarding: No
      ...0 .... = Learning: No
      .... 11.. = Port Role: Designated (3)
      .... ..1. = Proposal: Yes
      .... ...0 = Topology Change: No
   Root Identifier: 28672 / 11:11:11:11:11:01
   Root Path Cost: 20000
   Bridge Identifier: 32768 / 33:33:33:33:33:01
   Port identifier: 0x8002
   Message Age: 1
   Max Age: 6
   Hello Time: 1
   Forward Delay: 4
   Version 1 Length: 0

FIG. 6

Frame 96 (60 bytes on wire, 60 bytes captured)
IEEE 802.3 Ethernet
   Destination: Spanning-tree-(for-bridges)_00 (01:80:c2:00:00:00)
   Source: 22:22:22:22:22:03
   Length: 39
   Trailer: AAAAAAAAAAAAAA
Logical-Link Control
   DSAP: Spanning Tree BPDU (0x42)
   IG Bit: Individual
   SSAP: Spanning Tree BPDU (0x42)
   CR Bit: Command
   Control field: U, func=UI (0x03)
Spanning Tree Protocol
   Protocol Identifier: Spanning Tree Protocol (0x0000)
   Protocol Version Identifier: Rapid Spanning Tree (2)
   BPDU Type: Rapid/Multiple Spanning Tree (0x02)
   BPDU flags: 0x79 (Agreement, Forwarding, Learning, Port Role:
      Root, Topology Change)
      0... .... = Topology Change Acknowledgment: No
      .1.. .... = Agreement: Yes
      ..1. .... = Forwarding: Yes
      ...1 .... = Learning: Yes
      .... 10.. = Port Role: Root (2)
      .... ..0. = Proposal: No
      .... ...1 = Topology Change: Yes
   Root Identifier: 28672 / 11:11:11:11:11:01
   Root Path Cost: 20000
   Bridge Identifier: 32768 / 33:33:33:33:33:01
   Port identifier: 0x8002
   Message Age: 1
   Max Age: 6
   Hello Time: 1
   Forward Delay: 4
   Version 1 Length: 0

FIG. 7

LIGHTWEIGHT NODE BASED NETWORK REDUNDANCY SOLUTION LEVERAGING RAPID SPANNING TREE PROTOCOL (RSTP)

CROSS REFERENCE TO RELATED APPLICATIONS

This application claims the benefit of U.S. Provisional Patent Application No. 60/917,494, filed May 11, 2007, which is hereby incorporated by reference in its entirety.

STATEMENT REGARDING FEDERALLY SPONSORED RESEARCH & DEVELOPMENT

The United States Government has acquired certain rights in this invention pursuant to Contract No. F33657-01-D-2050/0027, issued by the Department of the Air Force.

FIELD OF THE INVENTION

This invention relates generally to embedded network architectures, and more specifically, to a node based solution for dual redundant networks with rapid spanning tree protocol (RSTP) enabled bridges.

BACKGROUND

An embedded network architecture with critical applications on an inter-node communication platform typically needs a commensurate level of fault tolerance. One approach to provide fault tolerance is by using a dual redundant network, where inter-node communication on the network can be provided using the Transmission Control Protocol/Internet Protocol (TCP/IP) suite. Ethernet is commonly used as the local area network (LAN) protocol used for interconnecting embedded device nodes. Redundant Media Access Control (MAC) bridges, such as Ethernet switches, can be employed to facilitate multiple inter-node paths.

This solution is appropriate when there is only a single instance of each node and such nodes will utilize two network ports. For each of these nodes, one of the two ports will be connected to a primary bridge and the other will be connected to a secondary bridge. Hence, the network topology is dual redundant, providing redundant paths between any pair of dual ported nodes. Other solutions for redundant networking, such as heartbeat and token ring type schemes, require features that are not readily available on embedded network devices and/or are not transparent to the application.

Rapid spanning tree protocol (RSTP), as defined in the IEEE Standard 802.1w, is a MAC bridge (i.e., IEEE 802.1D) based protocol and is a widely accepted feature supported on most embedded Ethernet switches. RSTP is typically enabled on interconnected bridges to preclude the existence of network loops that could result in broadcast storms and also provides path redundancy.

SUMMARY

In accordance with one embodiment, a method for rapid dynamic node switchover in a network with two or more redundant and interconnected bridges, wherein a first of the bridges operates as a root bridge is provided. Each node includes two ports where each port is coupled to a respective one of the bridges. The method includes defining a bridge identifier at a node which presents the node as a capable bridge to the two or more fully compliant, rapid spanning tree protocol (RSTP) enabled media access control (MAC) bridges, forwarding a bridge protocol data unit (BPDU) message from the node that defines the node as an inferior alternate path to the root bridge, facilitating a dynamic sensing of a communication absence between the root bridge and the node, receiving a topology change message at the node from the second redundant bridge, and sending an agreement message from the node to the second redundant bridge, such that the node automatically begins receiving messages from the second redundant bridge.

In accordance with another embodiment, a communication network is provided that includes at least two redundant MAC bridges, a first of the bridges configured to operate as a root bridge, and at least one node. Each node includes two network ports, each port communicatively coupled to a respective one of the bridges. The nodes are configured to define a bridge identifier that presents each node as a capable bridge to the two or more fully compliant, RSTP enabled MAC bridges, forward a BPDU message which defines the node as an inferior alternate path to the root bridge, facilitate dynamic detection of the absence of communication between the root bridge and the node, receive a topology change message from a second of the redundant bridges, and send an agreement message from the node to the second bridge indicating the node is configured to receive messages from the second bridge.

In accordance with still another embodiment, a network node including two network ports is provided. The node is configured to define a bridge identifier that presents the node as a bridge to two or more fully compliant, RSTP enabled MAC bridges, a first of the bridges being configured as a root bridge, forward a BPDU message which defines the node as an inferior alternate path to the bridge configured as a root bridge, facilitate dynamic sensing of an absence of communications between the bridge configured as a root bridge and the node, receive a topology change message from one of a network bridge not configured as the root bridge, and send an agreement message to a second of the bridges indicating the node is configured to receive messages from the second of the bridges.

The features, functions, and advantages that have been discussed can be achieved independently in various embodiments of the present invention or may be combined in yet other embodiments further details of which can be seen with reference to the following description and drawings.

DETAILED DESCRIPTION

The described embodiments illustrate how to get a node to participate in a failover activity in a manner consistent with rapid spanning tree protocol (RSTP) protocol, without incorporating the features of a full featured, RSTP enabled bridge. Since RSTP is normally implemented on bridges and is an inter-bridge communication protocol, changes on a network node would have to be implemented in order to take advantage of the inherent path redundancy features of RSTP. However, it is typically not desirable for such nodes to take on the role of a fully compliant RSTP enabled bridge, since this added responsibility could negatively impact the core function of each node.

The embodiments are related to redundant networks, and more particularly, to a method of having an embedded network device (i.e., node) participate in a multi-path redundancy protocol for dynamic path switch-over, the node modifying/generating network bridge/topology messages in a manner to control its communication with a root bridge or non-root bridge. The bridges in such network systems are typically interconnected and ideally this interconnection is also redundant. The redundancy prevents the possibility of a single point of failure, for example, using a method such as LACP (Link Aggregation Control Protocol, IEEE specification 802.3ad), which is standard in many Ethernet switches.

In one embodiment, a network interface device driver for network nodes is incorporated with a minimal set of changes which allow the nodes to take advantage of the inherent path redundancy provided by rapid spanning tree protocol (RSTP). RSTP is normally a solely inter-bridge communication protocol, but in the disclosed embodiments each node is limited from taking on the role of a full featured RSTP bridge. Such a configuration facilitates this path redundancy in a manner transparent to the application layer. Therefore, the described embodiments provide a path redundancy to each node, while having no impact on the application layer, through utilization of features readily available on typically employed embedded devices. In the event that the primary path to such a node fails, an alternate path to the node will automatically be enabled with little or no disruption of normal application operation. It should also be noted, that there is typically an affinity in such systems for the primary paths to such nodes. If the primary path becomes restored, such systems will typically switch to the primary node paths. This is sometimes referred to as fail back.

Figure 1:
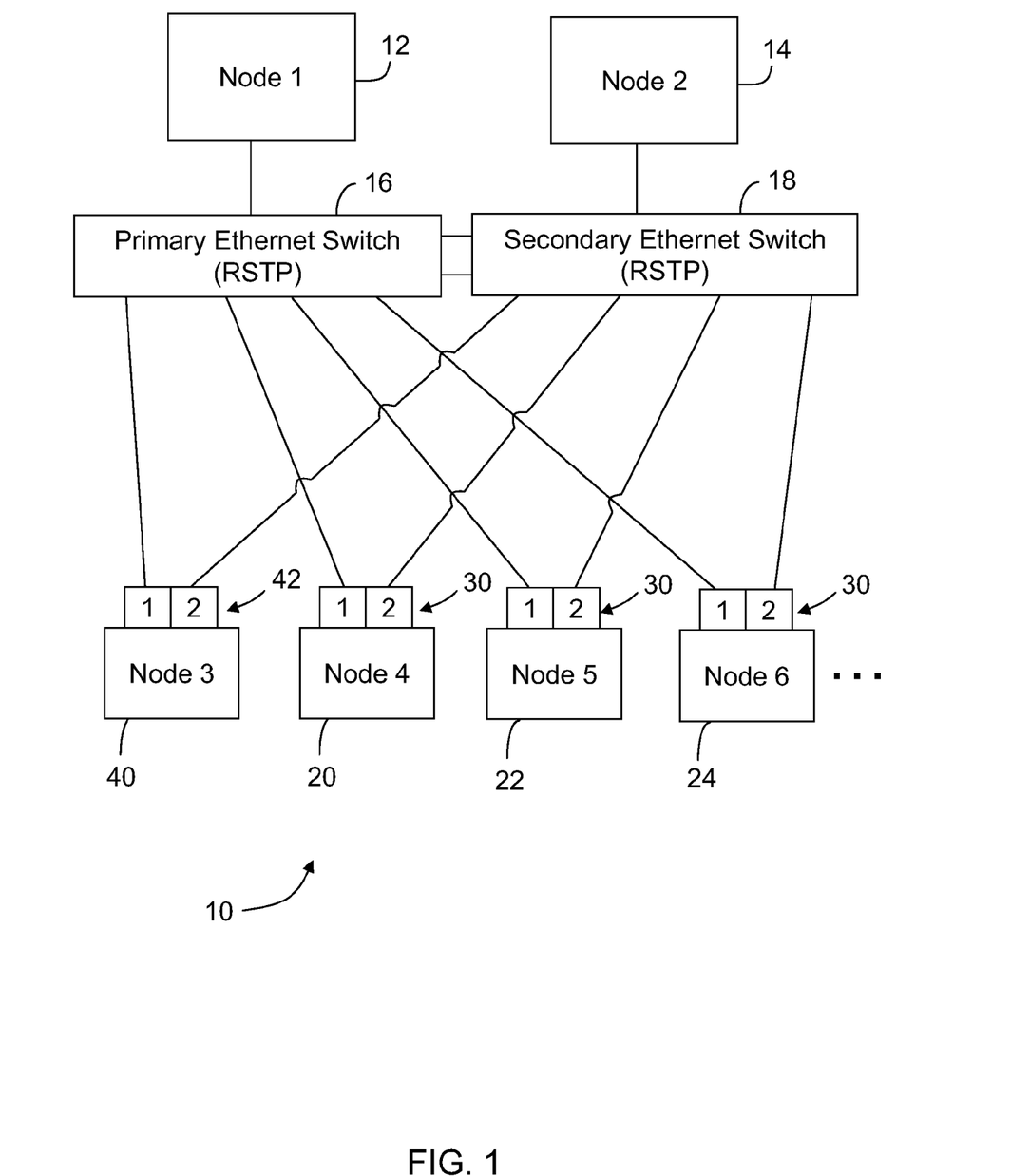
FIG. 1 is a schematic diagram illustrating an example network topology for a system, according to an embodiment.

FIG. 1 is a schematic diagram illustrating one example of a network topology for a system 10 which incorporates the above mentioned features with respect to providing dual redundancy. The illustrated embodiment for system 10 includes two singly connected (single ported) nodes, 12, 14 (nodes 1 and 2) which are configured as nodes of the network. A primary Ethernet switch 16 is connected to node 12 and a secondary Ethernet switch 18 is connected to node 14. As illustrated, secondary Ethernet switch 18 is in communication with the primary Ethernet switch 16. System 10 further includes a plurality of dually connected (dual ported) embedded processor nodes 20, 22, and 24, (nodes 4-6), such as single board computers (SBCs) or other types of embedded devices. Each of the processor nodes 20, 22, and 24 is capable of being in direct communication with the primary Ethernet switch 16 or the secondary Ethernet switch 18. It should be noted that while the embodiments are described as dual ported and as embedded devices for purposes of illustration, it should be understood that nodes that are other than dual ported are operable using the described embodiments, as are certain devices that are not embedded systems.

Each of the dual ported processor nodes 20, 22, and 24 includes a dual Ethernet network interface 30 which is capable of rapidly switching between the primary and secondary Ethernet switches 16 and 18. In certain embodiments, system 10 may include a specialized embedded device node 40 (node 3), which is also illustrated as being dual ported, and which in specific embodiments is a custom device also capable of rapidly switching between the primary and secondary Ethernet switches 16 and 18.

The network architecture for system 10 provides fault tolerance for applications that depend on a selected inter-node communication platform. As can be ascertained from FIG. 1, a dual redundant Ethernet network can provide fault tolerance for respective applications running thereon.

In one embodiment, the network defined by system 10 supports inter-node communication using the Transmission Control Protocol/Internet Protocol (TCP/IP) protocol suite. Ethernet is used in one embodiment as the local area network (LAN) protocol used for interconnecting the embedded device nodes 20, 22, 24, and 40. As described above, two redundant Ethernet switches will also be employed to facilitate multiple inter-node paths. For each embedded device node 20, 22, 24, and 40, one of the two ports is connected to the primary Ethernet switch 16 and the other will be connected to the secondary Ethernet switch 18. Hence, the network topology is dual redundant, providing redundant paths between any pair of dual ported nodes, as a node typically listens for communications at each port. Therefore, no single network failure shall cause the termination of communication between any two dual ported nodes for any longer than a predetermined time period, for example, about three seconds.

As system 10 is comprised entirely of embedded devices, the network architecture is focused on leveraging established standards to provide the necessary level of fault tolerance with minimal impact on the application. In one embodiment, an Open Systems Interconnection (OSI) Layer 2 solution is utilized to ensure that the redundancy solution was transparent to the application. In the embodiment, rapid spanning tree protocol (RSTP), as defined in the IEEE Standard 802.1w, is utilized as the bridge based protocol for providing multi-path redundancy. RSTP is a widely accepted feature supported on most embedded Ethernet switches. RSTP is typically enabled on interconnected bridges to preclude the existence of network loops that could result in broadcast storms and also provides path redundancy.

In a typical network application, since RSTP is implemented on network bridges and is an inter-bridge communication protocol, changes on the node are required to take advantage of the inherent path redundancy features of RSTP. However, in the application of system 10, it is not desirable for each node to take on the role of a fully compliant RSTP enabled bridge. Specifically, the added responsibility associated with a fully compliant RSTP enabled bridge may negatively impact the core function of each node. Therefore, as further explained herein, a minimal set of changes at the driver level are incorporated to get each node 20, 22, 24 and 40 to participate in the failover activity, in a manner consistent with the RSTP protocol, without acting like or incorporating the features of a full featured, RSTP enabled Ethernet bridge.

Further, in system 10, the behavior of the RSTP protocol on each node may be the same, and the implementation at each node may be the same, even though the device types of nodes 20, 22, and 24 may be different, which allows for ease in implementation. For these nodes, for example, the modification to support the RSTP protocol is embedded in the software of the network interface driver. In other embodiments, the specific implementation may be driven by the hardware of the network interface. On the other hand, the specialized embedded device node 40, being a custom device, incorporates changes to the network interface device driver to support the functions relating to the RSTP protocol.

In the example of FIG. 1, the nodes 12 and 14 will interoperate with the system normally and are not dual ported. While the example of FIG. 1 is applied to Ethernet switches, those skilled in the art will appreciate that the described embodiments are applicable to applications that use other bridge devices, and that the embodiments are also applicable to node implementations other than embedded systems.

A standard RSTP network configuration is achieved through the exchange of bridge protocol data unit (BPDU) messages. The MAC layer may need to be configured to allow a node to receive RSTP bridge protocol data unit (BPDU) frames. BPDU messages are used to elect a single root bridge when new bridges are introduced to the network topology. Once the network has converged and a root bridge has been elected, the root bridge generates/transmits a BPDU message once per "Hello Time", or epoch, which can range from one second in length to several seconds in length. For purposes of description, an example epoch is one second. These messages are propagated down the spanning tree to the other bridges in the topology. When non-root bridges receive a BPDU frame, they forward a BPDU frame down the spanning tree to the other non-root bridges based on the received BPDU frame.

Figure 2:
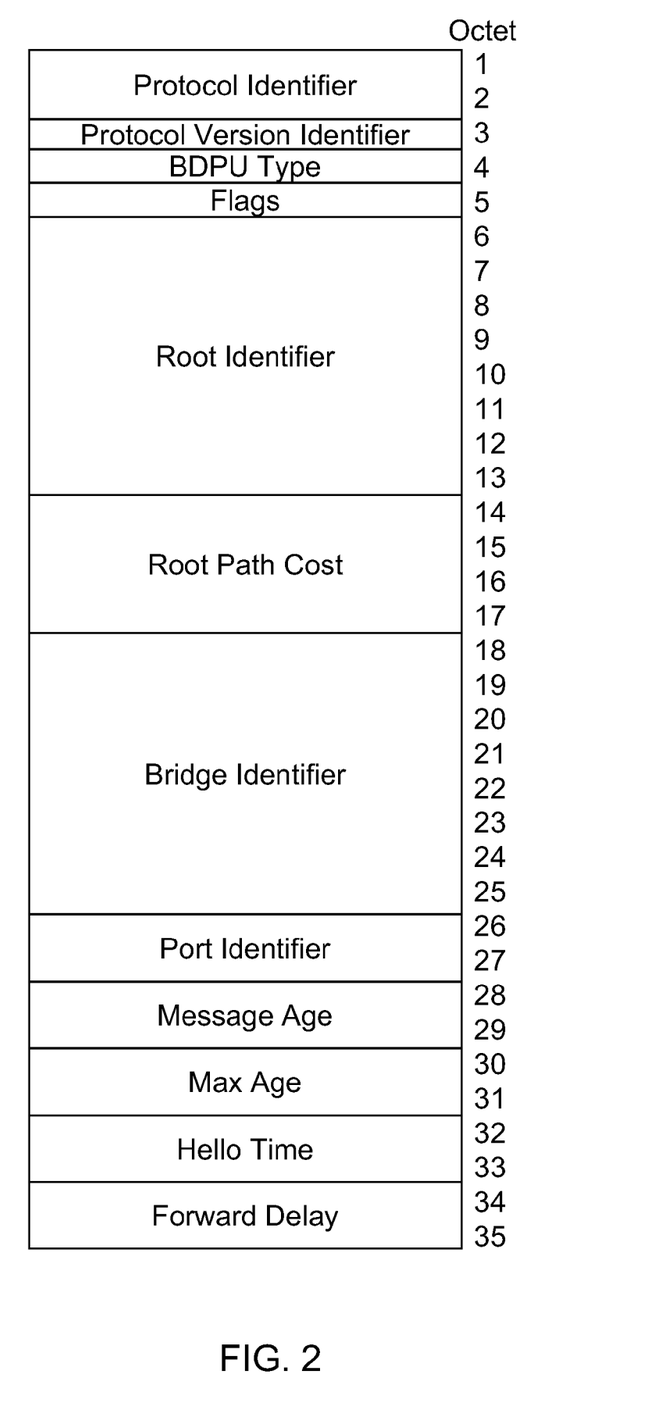
FIG. 2 is bridge protocol data unit (BPDU) frame format.
Figure 3:
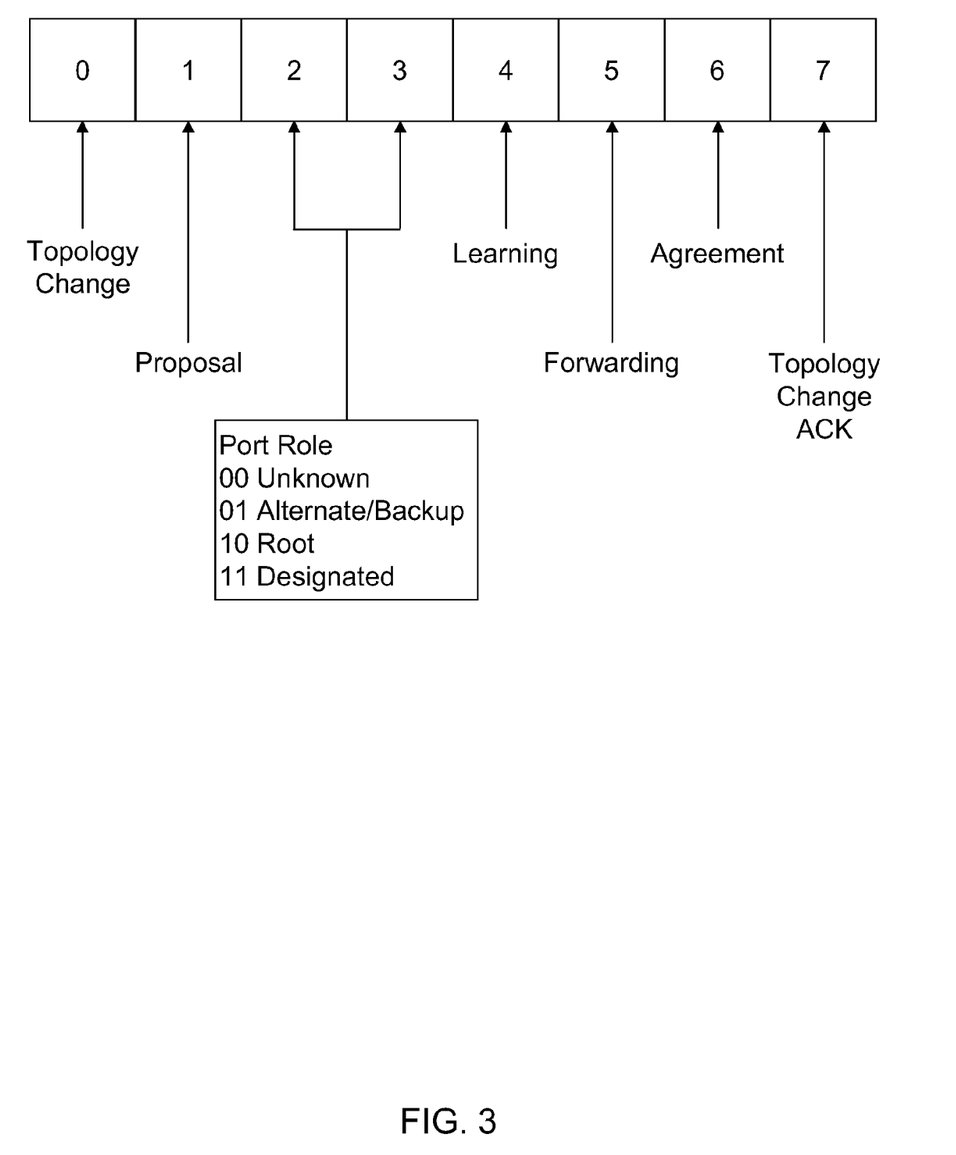
FIG. 3 is a rapid spanning tree protocol (RSTP) flag format.

FIG. 2 is a diagram of a RSTP BPDU message frame format and FIG. 3 is a diagram of a byte representing an example RSTP flag format. Now referring specifically to FIG. 2, a Protocol identifier, version, and BPDU message type identifies the frame as either a spanning tree protocol (STP) or RSTP BPDU message. The flags identify the role and state of the port/bridge generating the BPDU frames, identify the state of topology change negotiation between bridges, and change dynamically based on current network topology and topology changes. The root ID field identifies the priority of the root bridge, identifies the Media Access Control (MAC) address of the elected root bridge, and is used to determine bridge supremacy/inferiority during the election process. The root path cost field identifies the path cost to reach the root bridge through the port generating the BPDU frames and is used to determine bridge supremacy/inferiority during the election process. The bridge ID field identifies the priority of the bridge generating the BPDU frames, identifies the MAC address of the bridge generating the BPDU frames, and is used to determine bridge supremacy/inferiority during the election process.

The port ID field identifies the port ID associated with the port generating the BPDU frames and is used to determine bridge inferiority during the election process. The message age field identifies the age of the BPDU frame and is incremented by one every time the BPDU frame is received. The maximum age field identifies the maximum age the BPDU frame is allowed to take on before being dropped and is a modifiable bridge configuration parameter. The hello time field identifies the frequency with which the root bridge generates periodic BPDU frames and is a modifiable bridge configuration parameter. The forward delay field identifies the delay used by the bridge to transition root and designated ports to the forwarding state and is a modifiable bridge configuration parameter. For a more detailed description of BPDU message fields, refer to IEEE Std 802.1D, incorporated herein by reference.

For clarity, and with respect to FIG. 1, the term "root bridge" corresponds to the primary Ethernet switch 16, the term "non-root bridge" refers to the secondary Ethernet switch 18, and the term "dual ported node" refers to one or more of the nodes 20, 22, 24, and 40 identified in FIG. 1. A number of changes to an interface driver running at the node are necessary for the node to achieve the described RSTP path failover behavior. First of all, each dual ported node 20, 22, 24, and 40 receives and reacts to BPDU frames transmitted by either of the two connected switches 16 and 18. In order to allow the nodes to inspect RSTP BPDU frames, the MAC layer may need to be configured to allow a node to receive RSTP bridge protocol data unit (BPDU) frames. In the embodiment, each node also presents itself with three MAC addresses per the RSTP protocol. Each of the two network interfaces of a node has a unique MAC address. A third unique MAC address serves as the "Bridge ID" for each node and is included within all forwarded BPDU frames. This technique presents each node as an RSTP capable bridge to the two actual switches.

Each dual ported node 20, 22, 24, and 40 responds to the receipt of BPDU messages from either of the two switches in the network. A node first checks the "Proposal" bit of the flag byte in the received BPDU frame. If the "Proposal" bit is not set, this is an indication that the BPDU frame is the normal periodic RSTP message generated by the root bridge and the node forwards a modified version of the BPDU frame. If the "Proposal" bit is set, a topology change has occurred and the node responds with a topology change acknowledgement. A detailed description of node behavior for each of these two scenarios follows, and it should be noted that values utilized in some or all of the fields and flags are examples only. Specific implementations may utilize other values, when attempting to implement the RSTP solution described herein.

Figure 4:
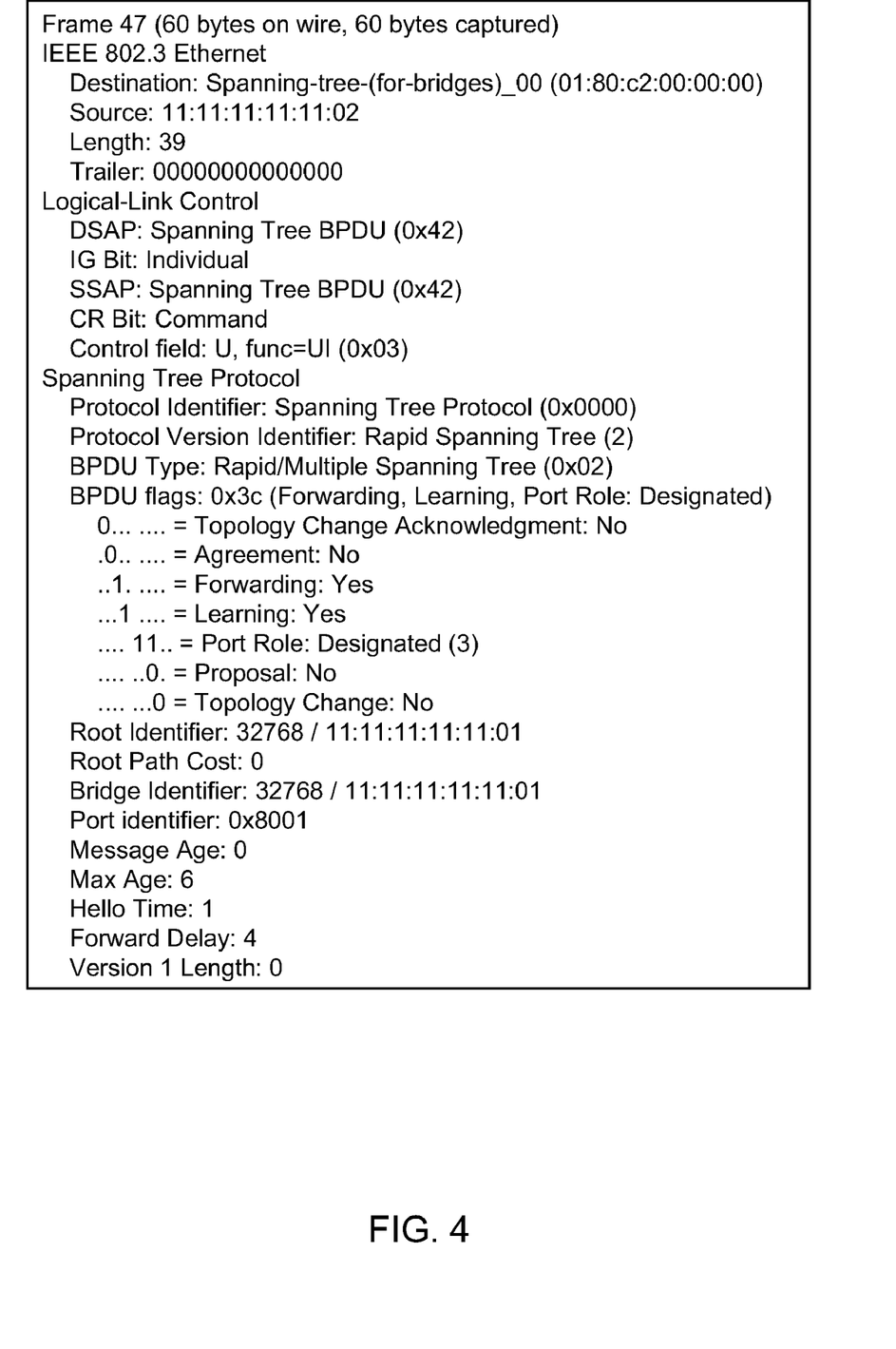
FIG. 4 is an example of a periodic BPDU that is generated by a root bridge.
Figure 5:
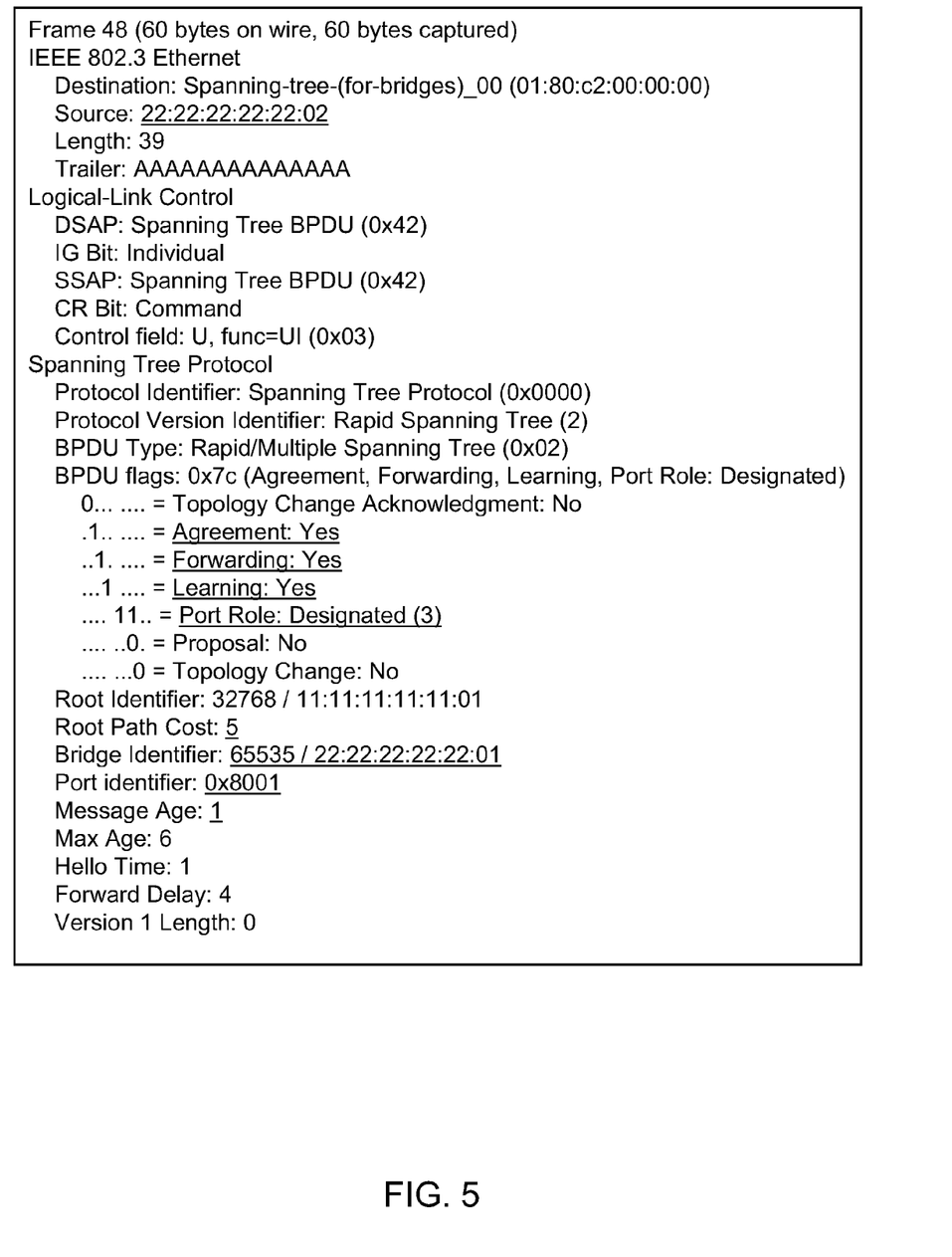
FIG. 5 is an example of a modified BPDU that is forwarded by a node.

FIG. 4 is an example of a periodic BPDU generated by the root bridge and FIG. 5 is an example of a modified BPDU that is forwarded by the receiving node. Fields modified by the node have been underlined in FIG. 5. When a periodic BPDU frame is received by a node on one of the two ports, the received BPDU frame is modified and forwarded out of the other port (i.e., the outbound port). The changes made to the received periodic BPDU frame before it is forwarded are described below. Specifically, the source MAC address is replaced with the MAC address of the outbound port. The Port ID is set to the outbound port number (i.e., 1 or 2). The Flags field is set to indicate that the outbound port of the node is in agreement and designated. The Root Path Cost field is set to a value lower than that of the two switches. The Bridge Priority field, which is part of the Bridge ID field, is set to a value higher than that of the two switches. The remainder of the Bridge ID field is set to the third unique MAC address associated with the node. The Message Age field is incremented by one.

Setting the Root Path Cost field to a lower value than the Root Path Cost of the switches forces the non-root bridge to recognize that its port is inferior to the node's port. Since the switch has the inferior port, it is responsible for blocking its ports, rather than expecting the nodes to perform port blocking. Setting the Bridge Priority field to a higher value (i.e., lower priority) than the two switches ensures that a node will never be elected as the root bridge during the root bridge election process.

Figure 6:
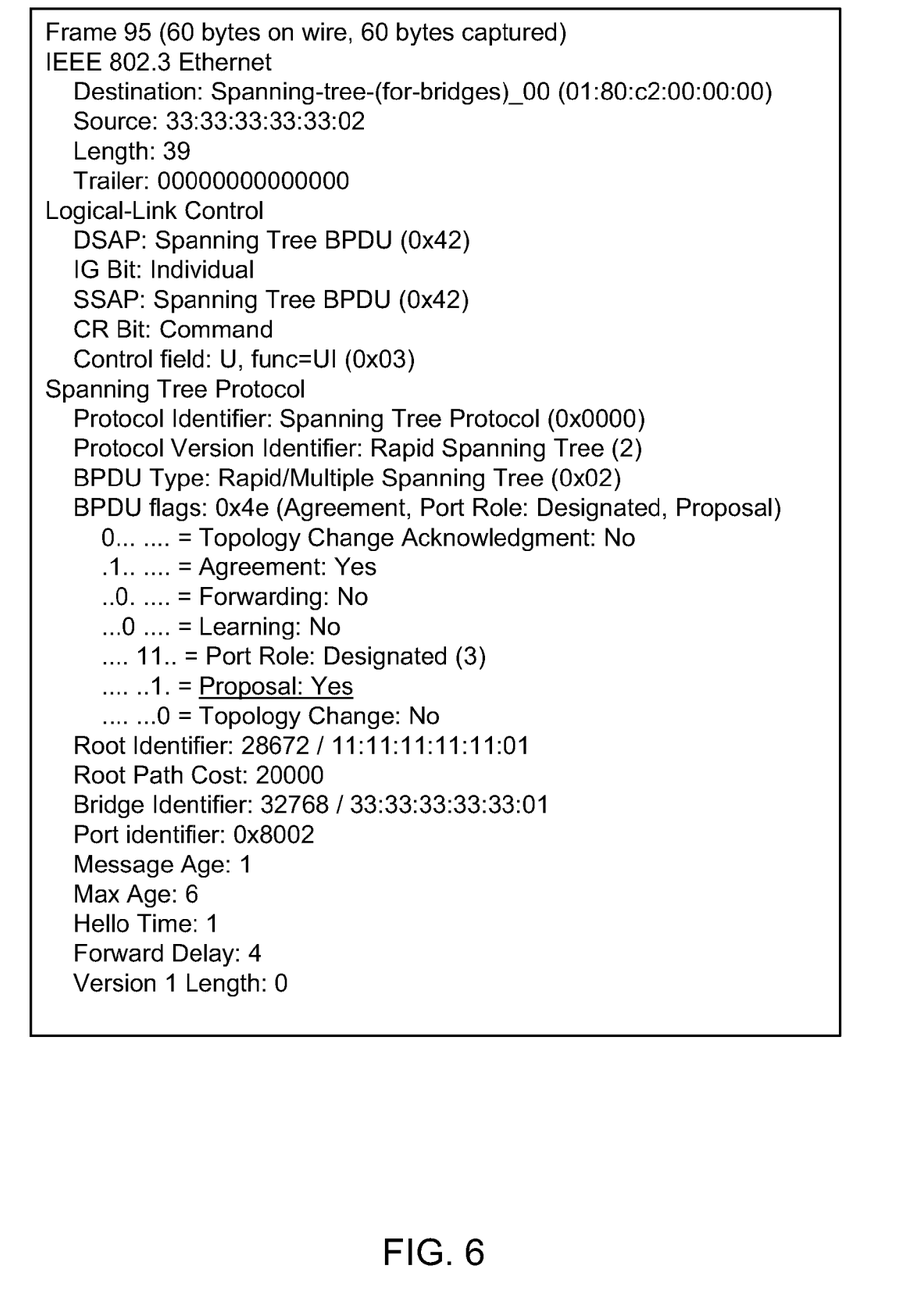
FIG. 6 is an example of a proposal BPDU that is generated by a non-root bridge.

When a network topology change occurs (e.g., new nodes are introduced to the topology or when a link is broken), the affected bridges transmit proposal BPDUs to other bridges down the spanning tree, proposing a new topology. If the proposals are accepted by bridges down the spanning tree, the new topology can rapidly become active. An example of a proposal BPDU generated by a non-root bridge is illustrated in FIG. 6.

If any node 20, 22, 24, or 40 receives a BPDU with the proposal bit of the Flags byte set, the node responds to the proposal. This response allows the sending bridge to immediately start forwarding traffic through the connection, allowing the node's backup link to rapidly become active after the switches have sensed that the primary path has failed. The failure of the path to the node's primary link is sensed by the non-root bridge in the network.

During normal operation, the root bridge generates periodic BPDUs (e.g., at a rate of about once per second depending on the configuration). The dual ported nodes receive these BPDUs on their primary interfaces, which are connected directly to the root bridge. The dual ported node then forwards these periodic messages to the non-root bridge through its secondary interface. When the non-root bridge sees these forwarded BPDU frames come from the node, it views the node as an alternate, inferior path to the root bridge. Due to the inferiority of the path, the non-root bridge will not forward traffic down this path, in effect blocking the path to the node's secondary interface. However, even though the non-root bridge is blocking traffic to the node, it continues to monitor the periodic BPDU traffic forwarded from that node. This behavior provides an indication to the non-root bridge that the alternate path to the root (i.e., through the node in this case) is still active, in spite of the fact that normal traffic will never actually be routed through the node.

When a link between the node and the root bridge fails, the node stops receiving periodic BPDUs from the root bridge and accordingly no longer forwards BPDUs to the non-root bridge. Per the RSTP protocol, after the non-root bridge fails to receive three consecutive periodic BPDUs, it initiates a topology change, sensing that its alternate path to the root has failed. It is during this topology change that the non-root bridge will send the node a topology change proposal BPDU. It should be noted that it is also possible for a node to detect a failed communications link and initiate a topology change proposal. In certain applications, node initiated topology changes help reduce failover times, resulting in improved system performance.

Figure 7:
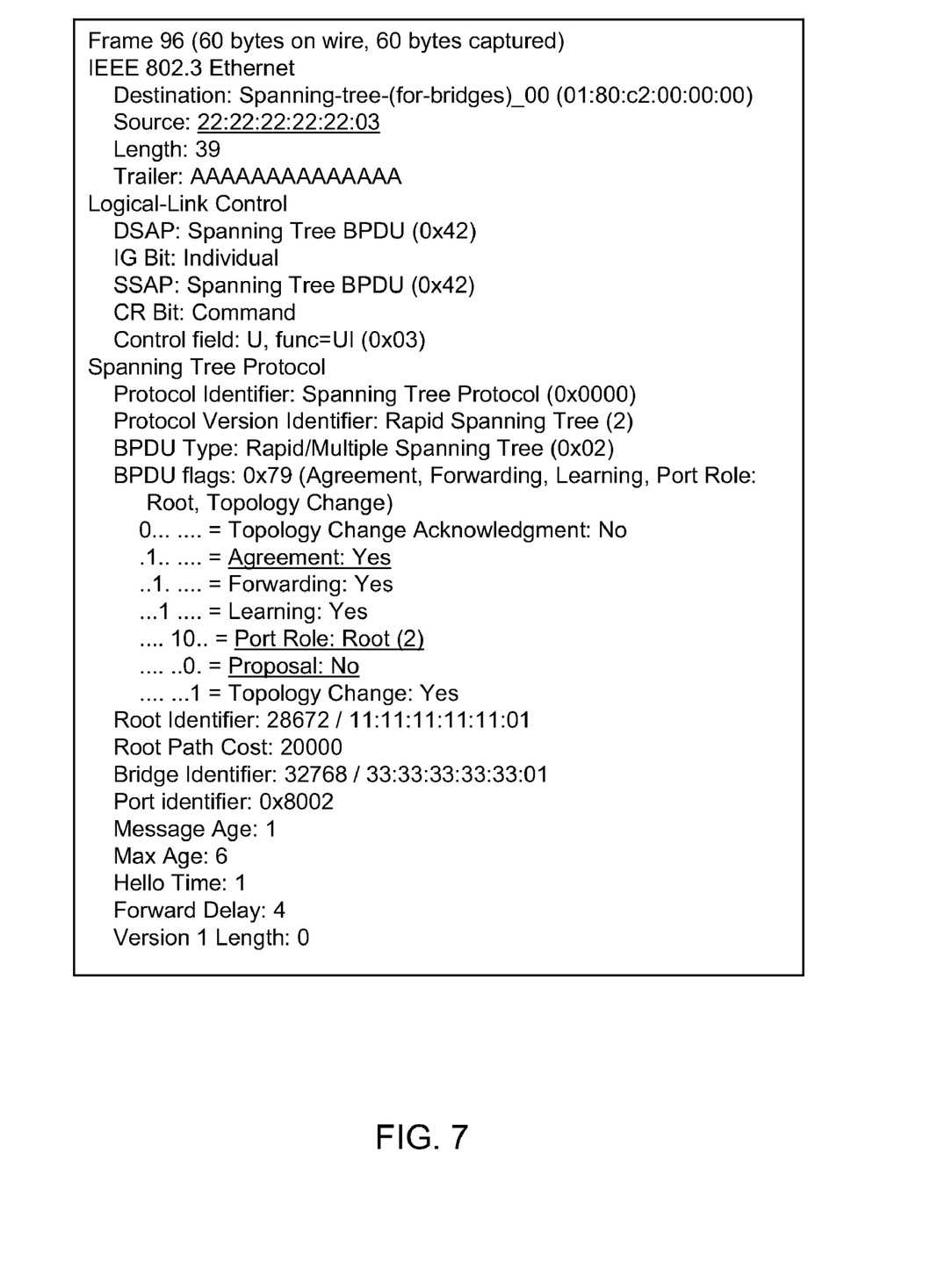
FIG. 7 is an example of a modified agreement BPDU that is generated by a node.

In response to the proposal BPDU, the node transmits an "agreement" BPDU on the same interface that the proposal was received on. The agreement BPDU is essentially a modified version of the proposal BPDU. The changes made to the proposal BPDU frame before sending it back to the proposing bridge are: the source MAC address is set to the MAC address of the interface that the proposal BPDU was received on and the "Flags" field is set to indicate topology change agreement (i.e., the Proposal bit is cleared, the Agreement bit is set, and the Port Role is set to Root). A modified agreement BPDU is generated by a node and then sent to the bridge proposing the topology change. An example of an agreement BPDU is illustrated in FIG. 7 where the fields modified by the node have been underlined.

The above described embodiments provide an approach to getting embedded processor nodes to act as RSTP bridges, by forwarding or responding to BDPUs, for the purposes of providing a fail over capability, in dual redundant networks.

Users benefit from such an approach because of its lower cost, specifically in reliable, redundant, embedded systems by utilizing a modified network interface driver method. The embodiments further allow a user to avoid development of customized solutions and further provide reliability/redundancy via an established protocol. With minimal localized changes on each dual ported node and multiple RSTP enabled bridges, the described embodiments provide network fault tolerance in a lightweight manner transparent to the application.

One or more of the above described embodiments include one or more modifications to hardware specific device drivers. However, the modifications are such that the same basic set of changes should be applicable to the device drivers of most network interface cards. Further benefits to such an implementation include a transparency to the application which simplifies application development and testing, no custom changes for the MAC bridges and applications utilized, and a leveraging of existing standard technology (i.e., RSTP) all while having a reduced complexity with respect to other more elaborate approaches mentioned above.

While the invention has been described in terms of various specific embodiments, those skilled in the art will recognize that the invention can be practiced with modification within the spirit and scope of the claims.

What is claimed is:

1. A method for rapid dynamic node switchover in a network with two or more redundant and interconnected bridges, wherein a first of the bridges operates as a root bridge, each node including two ports where each port is coupled to a respective one of the bridges, said method comprising:
   defining a bridge identifier at a node which presents the node as configured to receive a rapid spanning tree protocol (RSTP) bridge protocol data unit (BPDU) message from the two or more redundant and interconnected bridges, the bridges being rapid spanning tree protocol enabled media access control (MAC) bridges;
   forwarding the bridge protocol data unit (BPDU) message from the node that defines the node as an inferior alternate path to the root bridge;
   dynamically sense a communication absence between the root bridge and the node;
   receiving a topology change message at the node from a second of the two or more redundant and interconnected bridges; and
   sending an agreement message from the node to the second of the two or more redundant and interconnected bridges such that the node automatically begins receiving messages from the second of the two or more redundant and interconnected bridges.

2. The method according to claim 1 wherein forwarding a configured BPDU message from the node comprises:
   periodically receiving and configuring a BPDU message from the root bridge;
   determining if the BPDU message is a network topology change proposal; and
   forwarding the configured BPDU message to a second redundant bridge if the BPDU message is not a topology change proposal, causing the second redundant bridge to block messages to and from the node.

3. The method according to claim 1 wherein defining a bridge identifier at the node comprises programming a device driver associated with the node to participate in failover activity according to rapid spanning tree protocol (RSTP) protocol, but without incorporating the features of a full featured, RSTP enabled MAC bridge.

4. The method according to claim 1 wherein forwarding a configured BPDU message from the node comprises:
   ensuring that the MAC layer is configured to allow a node to receive RSTP bridge protocol data unit (BPDU) frames; and
   inspecting bridge protocol data unit frames at the node.

5. The method according to claim 4 further comprising presenting the node as having three media access control addresses per the rapid spanning tree protocol, an address for each of two network interfaces, and a third address configured to be utilized as a bridge identifier for the node.

6. The method according to claim 4 further comprising including the bridge identifier within all bridge protocol data unit frames forwarded by the node.

7. The method according to claim 1 wherein receiving a topology change message at the node from the second redundant bridge comprises:
   determining if the BPDU message is a network topology change proposal; and responding to a second redundant bridge with a topology change acknowledgement if the BPDU message is a topology change proposal.

8. A communication network comprising:
at least two redundant, rapid spanning tree protocol (RSTP) enabled media access control (MAC) bridges, a first of said bridges configured to operate as a root bridge; and
at least one node, each said node comprising two network ports, each said port communicatively coupled to a respective one of said bridges, said nodes configured to:
define a bridge identifier that presents said node as configured to receive a RSTP bridge protocol data unit (BPDU) message from said RSTP enabled MAC bridges;
forward a bridge protocol data unit (BPDU) message which defines said node as an inferior alternate path to the root bridge;
dynamically sense an absence of communication between the root bridge and said node;
receive a topology change message from a second of said redundant bridges; and
send an agreement message from said node to the second of said redundant bridges indicating said node is configured to receive messages from the second of said redundant bridges.

9. The communication network according to claim 8 wherein to forward a BPDU message, said node is configured to:
determine if the BPDU message is a network topology change proposal; and
forward the configured BPDU message to a second of said bridges if the BPDU message is not a topology change proposal, causing said second bridge to block messages to and from said node.

10. The communication network according to claim 8 wherein to define a bridge identifier that presents said node as a capable bridge, said node is configured to participate in failover activity according to rapid spanning tree protocol (RSTP) protocol.

11. The communication network according to claim 8 wherein to forward a BPDU message, said node is configured to:
ensure that a MAC layer is configured to allow a node to receive RSTP BPDU frames; and
inspect bridge protocol data unit frames received at said node.

12. The communication network according to claim 11 wherein said node is configured to include three media access control addresses, per said rapid spanning tree protocol, an address for each of said network ports, and a third address configured to be utilized as a bridge identifier for said node.

13. The communication network according to claim 12 wherein said node is configured to include the bridge identifier within all bridge protocol data unit frames forwarded by said node.

14. The communication network according to claim 8 wherein to receive a topology change message from a second of said bridges, said node is configured to:
determine if the BPDU message is a network topology change proposal; and
respond to said second redundant bridge with a topology change acknowledgement if the BPDU message is a topology change proposal.

15. The communication network according to claim 8 wherein said node and said bridges each comprise two or more network interfaces.

16. A network node comprising two network ports, said node configured to:
define a bridge identifier that presents said node as a bridge to two or more rapid spanning tree protocol (RSTP) enabled media access control (MAC) bridges, a first of the bridges being configured as a root bridge;
forward a bridge protocol data unit (BPDU) message which defines said node as an inferior alternate path to the bridge configured as the root bridge;
dynamically sense an absence of communications between the bridge configured as a root bridge and said node;
receive a topology change message from one of the bridges not configured as the root bridge; and
send an agreement message to a second of the bridges indicating said node is configured to receive messages from the second of the bridges.

17. The network node according to claim 16 configured to implement a portion of the rapid spanning tree protocol to provide path redundancy.

18. The network node according to claim 16 comprising a media access control layer configurable to allow said node to receive rapid spanning tree protocol, bridge protocol data unit frames.

19. The network node according to claim 16 wherein to forward a BPDU message, said node is configured to:
modify a received bridge protocol data unit frame according to the rapid tree spanning protocol; and
forward the modified frame down the spanning tree to other non-root bridges.

20. The network node according to claim 16 wherein each said network port is configured with unique media access control (MAC) address, said node further configured with a third unique MAC address to serve as a bridge identifier for said node, the third unique MAC address to be included in bridge protocol data unit frames forwarded by said node.

* * * * *